(12) United States Patent
Yokota et al.

(10) Patent No.: US 7,468,413 B2
(45) Date of Patent: Dec. 23, 2008

(54) RARE EARTH AGGREGATE FORMULATION USING DI-BLOCK COPOLMERS

(75) Inventors: Kazuhiko Yokota, Paris (FR); Jean-Francois Berret, Sevres (FR); Bruno Tolla, Paris (FR); Mikel Morvan, Princeton, NJ (US)

(73) Assignee: Khodia Inc., Cranbury, NJ (US)

( * ) Notice: Subject to any disclaimer, the term of this patent is extended or adjusted under 35 U.S.C. 154(b) by 225 days.

(21) Appl. No.: 11/042,647

(22) Filed: Jan. 25, 2005

(65) Prior Publication Data

US 2005/0176863 A1 Aug. 11, 2005

Related U.S. Application Data

(60) Provisional application No. 60/540,430, filed on Jan. 30, 2004.

(51) Int. Cl.
*C08K 3/10* (2006.01)
*C08L 33/02* (2006.01)

(52) U.S. Cl. .................. 524/403; 524/556
(58) Field of Classification Search ............ 524/403, 524/556

See application file for complete search history.

(56) References Cited

U.S. PATENT DOCUMENTS

| | | | | |
|---|---|---|---|---|
| 4,784,912 | A | * | 11/1988 | Schaeffer et al. ............ 428/402 |
| 5,681,877 | A | * | 10/1997 | Hosotte-Filbert et al. ..... 524/32 |
| 6,559,233 | B2 | * | 5/2003 | Bavouzet et al. ............ 525/244 |
| 2003/0059392 | A1 | * | 3/2003 | L'Alloret ................. 424/70.11 |

FOREIGN PATENT DOCUMENTS

| CN | 1270965 A | * | 10/2000 |
|---|---|---|---|
| CN | 1270972 A | * | 10/2000 |
| JP | 53004280 A | | 1/1978 |
| JP | 2002038066 A | * | 2/2002 |
| SU | 508514 A | * | 8/1978 |
| WO | WO 96/30421 | | 10/1996 |
| WO | WO 97/01478 | | 1/1997 |
| WO | WO 98/00257 | | 1/1998 |
| WO | WO 9800257 A1 | * | 1/1998 |
| WO | WO 98/58974 | | 12/1998 |
| WO | WO 99/03894 | | 1/1999 |
| WO | WO 99/31144 | | 5/1999 |

OTHER PUBLICATIONS

Otu et al., Makromol. Chem. Rapid. Commun., 3, 127 (1982).
Daikin Kogyo Co Ltd Japan and Matyjaszewski et al., Macromolecules 28, 2093 (1995).
Webster O. W., "Group Transfer Polymerization", p. 580-588 from the Encyclopedia of Polymer Science and Engineering, vol. 7 and H. F. Mark, N.M. Bikales, C. G. Overberger and G. menges, Eds., Wiley Interscience, New York, 1987.
D. Braun et al. Macromol. Symp. 111, 63 (1996).
Wayland et al., J. Am. Chem. Soc. 116, 7943 (1994).
Schmolka, J. Am. Oil Chem. Soc. 1977, 54, 110; or alternatively Wilczek-Veraet et al., Macromolecules 1996, 29, 4036.
Quirk and Lee (Polymer International 27, 359 (1992).
Derwent Abstract of 1976JP-0077875 of Asahi Chem Ind Co Ltd [ASAH].

* cited by examiner

*Primary Examiner*—Ling-Siu Choi (57) ABSTRACT

The present invention is directed to controlling aggregation of rare earth particles using block copolymers and rare earth base particles. More particularly, invention is also directed to forming stable complexes of rare earth aggregates by complexing rare earth base particles with oppositely charged-neutral di-block copolymers. Even more particularly, invention is also directed to forming stable complexes of rare earth nanoparticles by complexing rare earth ultrafine particles with oppositely charged-neutral di-block copolymers.

15 Claims, 3 Drawing Sheets

RARE EARTH AGGREGATE FORMULATION USING DI-BLOCK COPOLMERS

CROSS-REFERENCE TO RELATED APPLICATIONS

The present application claims the benefit of U.S. Provisional Application Ser. No. 60/540,430 filed on Jan. 30, 2004 which is incorporated herein by reference in its entirety.

FIELD OF THE INVENTION

This invention relates to rare earth particle formation, more specifically to stabilizing aggregates of rare earth nanoparticles.

BACKGROUND OF THE INVENTION

In recent years controlling the size of nanomaterials or nanoparticles has become increasingly important as each type of nanoparticle has distinctive size-dependent properties. One important characteristic of nanoparticles is their large surface, which may be modified at the interfaces to meet desired specification. This modification is often referred to as stabilizing the particles. Stabilizing may also include forming the particles into larger superparticles. It has been demonstrated that ampiphilic block copolymers are advantageous for stabilizing nanoparticles as each block copolymer can be tailored to a desired use.

A common major drawback of yielding stabilized rare earth particles, is producing a particle size distribution which is not narrow or which is, at least, insufficiently narrow. Furthermore rare earth nanoparticles tend to agglomerate to form greater aggregates. Thus, serious need continues to exist for monodisperse rare earth particles having a uniform and narrowly defined particle size distribution.

SUMMARY OF THE INVENTION

The present invention is directed to controlling aggregation of rare earth particles using copolymers and rare earth base particles. More particularly, the invention is also directed to forming stable complexes of rare earth aggregates by complexing rare earth base particles with oppositely charged-neutral copolymers, for example di-block or tri-block copolymers. The invention is also directed to forming stable complexes of rare earth nanoparticles by complexing rare earth ultrafine particles with oppositely charged-neutral di-block copolymers.

The method of the invention provides a rare earth aggregate with improved pH stability and pH range.

The invention provides a method for fine tuning the number of aggregated rare earth base particles and thereby the final size of the mineral domains by changing the copolymer characteristics (i.e., molecular weight and composition).

In one embodiment, the present invention is directed to a method for controlling aggregation of yttrium hydroxyacetate nanoparticles by forming yttrium hydroxyacetate aggregates, the method comprising complexing a yttrium hydroxyacetate particle with oppositely charged poly(sodium acrylate)-b-poly(acrylamide) block copolymers (NaPA-b-PAM).

The invention relates to a formulation comprising:
a rare earth base particle (a), being cationic or anionic;
a block copolymer (b), comprising at least two blocks A and B, wherein
   block A being cationic if particle (a) is anionic, and anionic if particle (a) is cationic, and
   block B being neutral; and
water.

The invention also relates to a method of preparing a formulation comprising the steps of:
i) preparing a first solution comprising:
   a rare earth base particle (a) being cationic or anionic, and
   a liquid;
ii) preparing a second solution comprising:
   a block copolymer (b), comprising at least two blocks A and B, wherein
      block A being cationic if particle (a) is anionic, and anionic if particle (a) is cationic, and
      block B being neutral; and
   a liquid; and
iii) contacting said first solution and said second solution to obtain a formulation.

BRIEF DESCRIPTION OF THE DRAWINGS

These and other features and advantages of the invention will be better understood from the following detailed description, which is provided in connection with the accompanying drawing.

DETAILED DESCRIPTION OF INVENTION AND PREFERRED EMBODIMENTS

As used herein, the term "rare earth(s)" is understood to mean the elements of the group consisting of yttrium and elements of the Periodic Table with an atomic number of between 57 and 71 inclusive. Mention may more particularly be made, among rare-earths, of yttrium, lanthanum, neodymium, praseodymium, gadolinium, and cerium.

Rare Earth Particle (a)

Aggregates of rare earth particles are formed from rare earth particles. In essence, smaller sized rare earth base particles are used to obtain well defined larger rare earth particles or aggregates. Accordingly, ultrafine rare earth base particles may be used to form rare earth nanoparticles. Preferably a smaller sized rare earth base particle having a hydrodynamic diameter of about 10 nm or less is used to make rare earth aggregates in accordance with the invention. Aggregates of any suitable size may be formed in accordance with the invention. In one embodiment of the invention, formed aggregates will have a hydrodynamic diameter of from about 25 nm or larger and more preferably from about 60 nm to about 100 nm or larger.

The rare earth base particles are charged in order to stabilize each other by electrostatic repulsion. Accordingly, the base particle is either cationic or anionic.

The rare earth base particle may be formed of any suitable rare earth composition. Rare earth oxides, for example yttrium oxide, cerium oxide, and zirconium oxide may be used to synthesize suitable rare earth salts. Suitable salts for the invention are, in particular, salts which are soluble in an aqueous medium, such as, for example, the nitrates, chlorides, acetates and carboxylates, or admixture thereof. The preferred salts according to the invention are the acetates. Particularly exemplary rare earths include yttrium, lanthanum, gadolinium, lutecium, cerium, zirconium, and terbium.

In a process in accordance with the invention the rare earth base particle synthesis process is based on two chemical phenomena: the dissolution of a rare earth in a salt solution, preferably acetic acid at 100° C. and the reprecipitation occurring during cool-down to room temperature. In a preferred embodiment a rare earth, for example yttrium oxide, in the form of a powder is dissolved in a reagent grade solution, preferably acetic acid, to form a rare earth salt particle, for example yttrium hydroxyacetate. The solution is preferably poured in a glass reflux reactor and subsequently the rare earth powder is gradually introduced in the reactor at the stirring rate of about 300 rpm. After all the powder has been put in the solution, the reactor is preferably heated up to about 100° C. in about 30 min. The solution is then kept at its boiling point approximately of 100° C. for about 2 hours. The reactor is preferably gradually cooled down to room temperature, under atmospheric pressure. The sediment rare earth base particles left at the bottom of the reactor are preferably removed by centrifugation at 10,000 rpm for 1 hour. These synthesis parameters such as the thermal treatment conditions were decided on the basis of the optimal results in previous works but may vary without effecting the embodiments of the invention.

Block Copolymer (b)

The block copolymer (b) preferably comprises at least two different blocks, block A, and block B. It is preferably selected from the group consisting of (block A)-(block B) di-block copolymers, (block A)-(block B)-(block A) tri-block copolymers, and (block B)-(block A)-(block B) tri-block copolymers. More particularly, the block copolymer (A) is chosen from among linear block copolymers, block copolymers with a comb structure, star structure or dendrimeric (hyperbranched) structure. The block copolymer is preferably a linear block copolymer. By linear it is meant that the blocks arrangement is linear.

A block is usually defined by the repeating units it comprises. A block may be defined by naming a polymer, or by naming the monomers it is derived from. A block may be a copolymer, comprising several kind of repeating units, deriving form several monomers. Hence, block A and block B are different polymers, derived from different monomers, but they may comprise some common repeating units (copolymers). Block A and block B preferably do not comprise more than about 50% of a common repeating unit (derived from the same monomer). The polymer characteristics can be varied in accordance with the desired nanoparticle aggregation number. Accordingly the polymer characteristics can be varied to increase or decrease the size of the mineral domains resulting from the aggregation of the base rare earth particles.

Block A is a polyionic (polyanionic or polycationic) block in pH conditions of the formulation. That means that block A comprises ionic (anionic or cationic) repetitive units whatever the pH, or that block A comprises repetitive units that may be neutral or ionic (anionic or cationic) depending on the pH of the formulation (the units are potentially ionic). A unit that may be neutral or ionic (anionic or cationic), depending on the pH of the composition, will be thereafter referred to as an ionic unit (anionic or cationic) or as a unit deriving from an ionic monomer (anionic or cationic), whether it is in a neutral form or in an ionic form (anionic or cationic).

In a particular embodiment of the invention, block A is a cationic block, comprising units derived from cationic monomers.

Examples of cationic blocks are blocks comprising units derived from monomers selected from the group consisting of:

aminoalkyl (meth)acrylates, (meth)aminoalkyl (meth)acrylamides;

monomers comprising at least one secondary, tertiary or quaternary amine function, or a heterocyclic group containing a nitrogen atom, vinylamine or ethylenimine;

their mixtures, their salts, and macromonomers deriving there from.

Preferred cationic monomers comprise quaternary ammonium group of formula wherein R, which is identical or different, represents a hydrogen atom, an alkyl group comprising 1 to 10 carbon atoms, or a benzyl group, optionally carrying a hydroxyl group, and comprise an anion (counter-ion). Examples of anions are halides such as chloride and bromides, sulphates, hydrosulphates, alkylsulphates (for example comprising 1 to 6 carbon atoms), phosphates, citrates, formates, and acetates.

Examples of cationic monomers include:

dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;

ethylenimine, vinylamine, 2-vinylpyridine, 4-vinylpyridine;

trimethylammonium ethyl (meth)acrylate chloride, trimethylammonium Ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido chloride, trimethyl ammonium propyl (meth)acrylamido chloride, vinylbenzyl trimethyl ammonium chloride, diallyldimethyl ammonium chloride, their mixtures, and macromonomers deriving therefrom.

It should be noted that cationic block units may comprise one cationic (or potentially cationic, depending from pH) group or more, for example two.

In a particular embodiment of the invention, block A is a polyanionic block, comprising units derived from anionic monomers. Examples of polyanionic blocks are blocks comprising units derived from monomers selected from the group consisting of:

alpha ethylenically unsaturated monomers comprising a phosphate or phosphonate group, alpha ethylenically unsaturated monocarboxylic acids, monoalkylesters of alpha ethylenically unsaturated dicarboxylic acids, monoalkylamides of alpha ethylenically unsaturated dicarboxylic acids, alpha ethylenically unsaturated compounds comprising a sulphonic acid group, and salts of alpha ethylenically unsaturated compounds comprising a sulphonic acid group.

Preferred anionic blocks are blocks derived from at least one monomer selected from the group consisting of:
- acrylic acid, methacrylic acid,
- vinyl sulphonic acid, salts of vinyl sulfonic acid,
- vinylbenzene sulphonic acid, salts of vinylbenzene sulphonic acid,
- alpha-acrylamidomethylpropanesulphonic acid, salts of alpha-acrylamidomethylpropanesulphonic acid
- 2-sulphoethyl methacrylate, salts of 2-sulphoethyl methacrylate,
- acrylamido-2-methylpropanesulphonic acid (AMPS), salts of acrylamido-2-methylpropanesulphonic acid, and
- styrenesulphonate (SS).

Block B is a neutral block in pH conditions of the formulation. Units comprised in block B are preferably neutral whatever the pH. Blocks that are ionic in the pH conditions of the formulation are usually considered water-soluble. Thus, block A and block B are usually water-soluble. By water-soluble block copolymer, it is meant that the block copolymer does not phase separate macroscopically in water at a concentration from 0.01% and 10% by weight, at a temperature from 20° C. to 30° C.

Examples of neutral blocks usually considered as hydrophilic are blocks comprising units derived from at least one monomer selected from the group consisting of:
- ethylene oxide,
- vinyl alcohol,
- vinyl pyrolidone,
- polyethylene oxide (meth)acrylate (i.e. polyethoxylated (meth)acrylic acid),
- monoalkylesters of alpha ethylenically unsaturated dicarboxylic acids,
- dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide,
- monoalkylamides of alpha ethylenically unsaturated dicarboxylic acids, and poly(ethyleneglycol)$_n$ ethyl or methyl ether acrylate whereby n is greater than four (4) and preferably greater than six (6).

Preferred neutral blocks usually considered as hydrophilic are blocks comprising units derived from at least one monomer selected from the group consisting of:
- acrylamide, methacrylamide,
- 2-hydroxyethylacrylate,
- polyethyleneglycolether (meth)acrylate, and poly(ethyleneglycol)$_n$ ethyl or methyl ether acrylate whereby n is greater than four (4) and preferably greater than six (6).

At least one block selected from the group consisting of block A and block B derives from alpha ethylenically unsaturated monomers. In a preferred embodiment, block A and block B are derived from alpha ethylenically unsaturated monomers. More precisely, it is meant that for block A and/or block B, at least 50% of the repeating units are alpha ethylenically unsaturated monomers derived units.

From the monomers mentioned above, alpha ethylenically unsaturated monomers include:
- dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
- ethylenimine, vinylamine, 2-vinylpyridine, 4-vinylpyridine;
- trimethylammonium ethyl (meth)acrylate (also called 2-(acryloxy)ethyltrimethylammonium, TMAEAMS) chloride, trimethylammonium ethyl (meth)acrylate (also called 2-(acryloxy)ethyltrimethylammonium, TMAEAMS) methyl sulphate, dimethylammonium ethyl (meth)acrylate benzyl chloride, 4-benzoylbenzyl dimethylammonium ethyl acrylate chloride, trimethyl ammonium ethyl (meth)acrylamido chloride, trimethyl ammonium propyl (meth)acrylamido chloride, vinylbenzyl trimethyl ammonium chloride,
- diallyldimethyl ammonium chloride,
- acrylic acid, methacrylic acid,
- vinyl sulphonic acid, salts of vinyl sulfonic acid,
- vinylbenzene sulphonic acid, salts of vinylbenzene sulphonic acid,
- alpha-acrylamidomethylpropanesulphonic acid, salts of alpha-acrylamidomethylpropanesulphonic acid
- 2-sulphoethyl methacrylate, salts of 2-sulphoethyl methacrylate,
- acrylamido-2-methylpropanesulphonic acid (AMPS), salts of acrylamido-2-methylpropanesulphonic acid,
- styrenesulphonate (SS),
- vinyl alcohol
- vinyl pyrolidone,
- acrylamide, methacrylamide and
- 2-hydroxyethylacrylate.

There are several methods for making block copolymers. It is possible for example to use anionic polymerization with sequential addition of two (2) monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a block polymer at each of the ends of another block polymer as described for example by Katayose and Kataoka, Proc. Intern. Symp. Control. Rel. Bioact. Materials, 1996, 23, 899.

In the context of the present invention, it is recommended to use living or controlled polymerization as defined by Quirk and Lee (Polymer International 27, 359 (1992)). Indeed, this particular method makes it possible to prepare polymers with a narrow dispersity and in which the length and the composition of the blocks are controlled by the stoichiometry and the degree of conversion. In the context of this type of polymerization, there are more particularly recommended the block copolymers which can be obtained by any so-called living or controlled polymerization method such as, for example:
- the controlled free-radical polymerization by the xanthates according to the teaching of application WO 98/58974,
- the controlled free-radical polymerization by the dithioesters according to the teaching of application WO 97/01478,
- the polymerization with the aid of nitroxide precursors according to the teaching of application WO 99/03894,
- the controlled free-radical polymerization by the dithiocarbamates according to the teaching of application WO 99/31144,
- the atom transfer free-radical polymerization (ATRP) according to the teaching of application WO 96/30421,
- the controlled free-radical polymerization by the initiators according to the teaching of Otu et al., Makromol. Chem. Rapid. Commun., 3, 127 (1982),
- the controlled free-radical polymerization by degenerative transfer of iodine according to the teaching of Tatemoto et al., Jap. 50, 127, 991 (1975), Daikin Kogyo Co Ltd Japan and Matyjaszewski et al., Macromolecules, 28, 2093 (1995)), the group transfer polymerization according to the teaching of Webster O. W., "Group Transfer Polymerization", p. 580-588 from the "Encyclopedia of Polymer Science and Engineering", vol. 7 and H. F. Mark, N. M. Bikales, C. G. Overberger and G. Menges, Eds., Wiley Interscience, New York, 1987, the controlled free-radical polymerization by the derivatives of tetraphenylethane (D. Braun et al. Macromol. Symp. 111, 63 (1996)), the controlled free-radical polymerization by the organocobalt complexes (Wayland et al., J. Am. Chem. Soc. 116, 7973 (1994)).

Block copolymers obtained by a living or controlled free-radical polymerization process may comprise at least one transfer agent group at an end of the polymer chain. In particular embodiment such a group is removed or deactivated.

Living or controlled free-radical polymerization processes involve using a transfer agent, and implementing addition of different monomers to obtain block copolymers.

The preferred transfer agents for implementing the controlled polymerization process are dithioesters, thioethersthiones, dithiocarbamates, or xanthates. The preferred polymerization is the living radical polymerization using xanthates.

A "living" or "controlled" radical polymerization process used to make the block copolymers comprises the steps of:

a) reacting a mono-alpha-ethylenically-unsaturated monomer, at least a free radicals source compound, and a transfer agent, to obtain a first block, the transfer agent being bounded to said first block, b1) reacting the first block, another mono-alpha-ethylenically-unsaturated monomer, and, optionally, at least a radical source compound, to obtain a di-block copolymer, b2) optionally, repeating n times (n being equal to or greater than 0) step b1) to obtain a (n-2)-block copolymer, and then c) optionally, reacting the transfer agent with means to render it inactive.

For example, a "living" or "controlled" radical polymerization process used to make the di-block copolymers comprises the steps of:

a) reacting a mono-alpha-ethylenically-unsaturated monomer, at least a free radicals source compound, and a transfer agent, to obtain a first block, the transfer agent being bounded to said first block, b) reacting the first block, another mono-alpha-ethylenically-unsaturated monomer, and, optionally, at least a radical source compound, to obtain a di-block copolymer, and then c) optionally, reacting the transfer agent with means to render it inactive.

During step a), a first block of the polymer is synthesized. During step b), b1), or b2), another block of the polymer is synthesized.

Examples of transfer agents are transfer agents of formula (I):

(I)

wherein:

R represents an R2O—, R2R'2N— or R3-group, R2 and R'2, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R3 representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain,

R1 represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and The R1, R2, R'2 and R3 groups can be substituted by substituted phenyl or alkyl groups, substituted aromatic groups or the following groups: oxo, alkoxycarbonyl or aryloxycarbonyl (—COOR), carboxyl (—COOH), acyloxy (—O2CR), carbamoyl (—CONR2), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR2), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

wherein:

R2 and R2' represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R1 and R1' represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, p is between 2 and 10.

The mono-alpha-ethylenically-unsaturated monomers and their proportions are chosen in order to obtain the desired properties for the block(s). According to this process, if all the successive polymerizations are carried out in the same reactor, it is generally preferable for all the monomers used during one stage to have been consumed before the polymerization of the following stage begins, therefore before the new monomers are introduced. However, it may happen that monomers of the preceding stage are still present in the reactor during the polymerization of the following block. In this case, these monomers generally do not represent more than 5 mol % of all the monomers.

The average molecular weight of block copolymer (c) is preferably comprised between 1000 and 500,000 g/mol. It is more preferably less than 100,000 g/mol, and further more preferably between 15,000 and 50,000 g/mol. Within these ranges, the weight ratio of each block may vary. It is however preferred that each block has a molecular weight above 500 g/mol, and preferably above 1000 g/mol.

A polymer solution in accordance with the invention may be prepared by adding the desired amount of polymers in a powder form to deionized water, preferably having a conductivity of M$\Omega$ (Purification ion-exchange filter, Millipore). The polymer and water are preferably mixed for about 24 hours to achieve homogeneity with a concentration preferably in the range of between about 1% to about 10%. The solution may be neutralized using any suitable neutralizer, preferably a sodium hydroxide solution. For example, poly(acrylic acid) (PAA) parts dissociate protons and can be negatively charged with the increase of pH. The apparent pKa for acrylate parts in PAA are known to be around 5.5. In order to sufficiently charge PAA groups, the polymer solutions were neutralized at pH 7 by adding a 1N to 5N sodium hydroxide solution.

Process for Making the Formulation

A process for making the formulation according to the invention comprises mixing rare earth base particles (a) and block copolymers (b) to form stable aggregates of the rare earth base particles.

In a preferred embodiment, the process comprises the following steps:

i) preparing a first solution comprising:
   a rare earth base particle (a) being cationic or anionic, and
   a liquid;

ii) preparing a second solution comprising:
   a block copolymer (b), comprising at least two blocks A and B, wherein
      block A being cationic if particle (a) is anionic, and anionic if particle (a) is cationic, and
      block B being neutral; and
   a liquid; and iii) mixing said first solution and said second solution to obtain a formulation.

The mixing ratio X between the rare earth base particle solution and the block copolymer solutions is preferably defined as follows.

X=Volume of rare earth base particle solution at $C_0$/Volume of polymer solution at $C_0$ Any suitable mixing ratio X and initial concentration $C_0$ may be used. The mixing ratio X is considered to have a correlation with the charge ratio. In accordance with this formula, the mixed specimens are preferably prepared in the range of X=0.01 to 100 at the total concentration C=0.1% to 10%. In order to prepare the mixed solution at a desired concentration $C_0$, the two initial solutions should be prepared at the same concentration $C_0$.

Structure

The formulation according to the invention is in the form of a suspension of colloids in water. Generally, the colloids comprise rare earth base particles and polymers. In one embodiment the colloids comprise rare earth base particles and di-block copolymers. Without intending to be bound to any theory, it is believed that ionic groups of particles and polymers (c) interact to form a complex, said complex being in the form of colloids. It is believed that the chemical or electrostatic association between the base particles and the charged blocks of the copolymers promotes aggregation of the nanoparticles and the overall aggregate is thereby stabilized by the neutral block of the copolymer.

Figure 1:
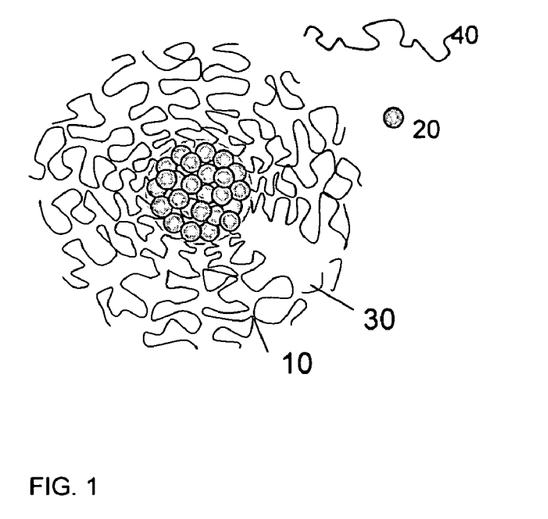
FIG. 1 is a schematic of a core-corona" structure of a complex in accordance with the present invention.

Prior to the invention it was difficult to obtain larger monodisperse particles, for example nanoparticles of greater than 50 nm, and particularly between about 50 nm to about 200 nm. The invention achieves this by complexing fairly monodisperse smaller particles, preferably ultrafine particles, of diameters of preferably 10 nm or less in a block copolymer, preferably di-block copolymer, solution to complex a larger monodisperse aggregate. The complexation of these particles is believed to occur at a critical mixing ratio X, as discussed above. Above this ratio X, the complexation leads to the formation of larger monodisperse aggregates having a core corona structure as shown in FIG. 1, with the core 10 consisting of densely packed rare earth base particles 20 and the corona 30 being formed by neutral polymer chains 40. The colloidal stability, particularly the pH and ionic strength of these complexed aggregates are well above conventional nanoparticles and aggregates.

Surprisingly, aggregates of the invention are so stable that films can be formed by removing the liquid from the formulation. The formed films formed from the dried solutions of the invention are generally transparent consistent with the dispersed state of the aggregates. Furthermore, prior to drying or removing the liquid from the formulation of the invention, the formulation is stable enough to resist disturbance when adding other additives, for example surfactants or polymers. Accordingly, It is to be noted that the scope of the present invention would not be exceeded by using surfactants or other additives. It should also be noted that films formed in accordance with the invention may be selected to provide luminescent properties. For example, by selecting a rare earth particle having luminescence properties, the resulting film will have luminescent properties. For example, europium may be selected to provide luminescence to a film in accordance with the invention.

Furthermore, it has been discovered that the invention may be useful for chemical mechanical polishing (CMP) of articles, for example, semiconductor substrates and wafers. For example, for CMP applications, cerium oxide particles in accordance with the invention of preferably above 20 nm and more preferably of about 50 nm may be used.

In order to further illustrate the invention and the advantages thereof, the following non-limiting examples are given.

EXAMPLES

Example 1

Yttrium polymer aggregates were formed as the result of the association between yttrium nanoparticles and block copolymers. The preparation of the yttrium polymer aggregates are described as follows.

Yttrium nanoparticle solution: Yttrium nanoparticles of about 4 nanometers (nm) were obtained from synthesis at a weight concentration of 25.5 wt. %. The yttrium nanoparticles were then diluted with tridistilled water to an initial concentration $C_0$ of 2 wt. % to form a yttrium nanoparticle solution. The yttrium nanoparticle solution was then observed via light scattering in order to verify that the size of the nanoparticles had not changed during the process and remained at 4 nm.

Block Copolymer solution: A block copolymer solution was formed from a powder block copolymer and water at the same initial concentration $C_0$=2 wt. %. The block copolymer used in this example was a poly(sodium acrylate)-b-poly (acrylamide) di-block, abbreviated as PANa-b-PAM, with molecular weight of 5000 g mol-1 for the charged block and 60,000 g mol-1 for the neutral block. The hydrodynamic radius of the di-block was about 7.9 nm and its weight-averaged molecular weight as determined from light scattering was 68300±2000 g mol-1. The pH of the 2 wt. % block copolymer solution was adjusted up to pH 7 by adding sodium hydroxide. Proportions of mixing: The two solutions were mixed in proportions of 20% -80% by volume (20% in nanoparticles and 80% in polymers).

The yttrium polymer aggregates formed rapidly after mixing. The total concentration of the mixed yttrium polymer complex solution was 2 wt. %. It was observed via light scattering that all block copolymer present in the solution were present in the aggregates and all nanoparticles present in the nanoparticle solution were present in the aggregates. Accordingly, there were no free block copolymer or particles left after the complex formation. The hydrodynamic diameter for the complex as determined from light scattering was found to be 60 nm. The stability of the yttrium polymer aggregate complexes were checked as a function of time for over periods longer than a year. The results of these tests were remarkable with stability lasting for longer than a year.

Films were prepared via casting the yttrium polymer complex solution described above or from more concentrated solutions of the yttrium polymer complex solution. Larger concentrations (i.e., larger than 2 wt. %) were obtained by solvent evaporation using the initial yttrium polymer complex solution.

Casting was performed using open Teflon cells designed to contain up to 2×2×0.5 $cm^3$ of liquid filled with the solution. The cell was stored at 60° C. for one day and under a vacuum (0.01 atm.), so as to allow the solvent to evaporate slowly.

During the casting process, the colloidal yttrium polymer complexes were not degraded and their aggregation numbers did not change. Once the solvent was evaporated, a 100 μm-thick film remained in the casting cell. The film was transparent and brittle. The film contained only the colloidal yttrium polymer complexes in a dense and solid state.

For comparison yttrium hydroxyacetate films without polymers were prepared using the same conditions as described above in this example. The resulting product of the evaporation process was a white and fine powder. Accordingly, no film could be formed for the comparison complex solution.

The films of this example were tested using the following three experimental techniques:

Small-Angle X-ray scattering (SAXS)

Transmission Electron Microscopy (TEM)

Thermal Gravimetry Analysis (TGA)

The three techniques provided a consistent description of the newly formed yttrium polymer film. It was determined that the film was a polymer matrix of poly(acrylamide) (PAM) that included metallic aggregates made from about 25 nanoparticles of yttrium hydroxyacetate. The density of the metallic aggregates in the matrix was estimated to be about $3\times10^{16}$ $cm^{-3}$.

Figure 2:
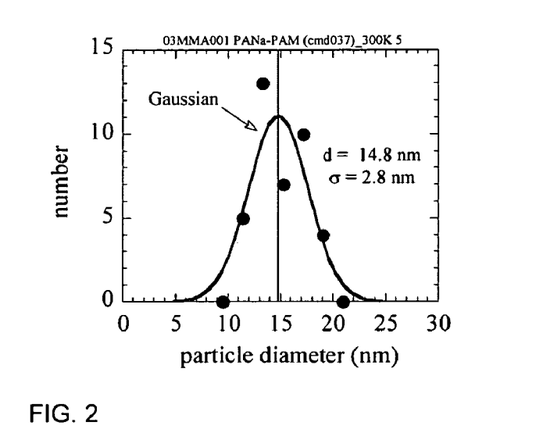
FIG. 2 shows the result of an analysis of the different patches identified by TEM with regard to Example 2 of the invention.

FIG. 2 below shows the result of an analysis of the different patches identified by TEM, and it represents the distribution of the cores of the aggregates. This distribution was well accounted for by a Gaussian function with an average diameter of 14.8 nm and standard deviation of about 2.8 nm. This result was in agreement with x-ray data obtained on the yttrium polymer complex solutions and on the resulting film.

Figure 3:
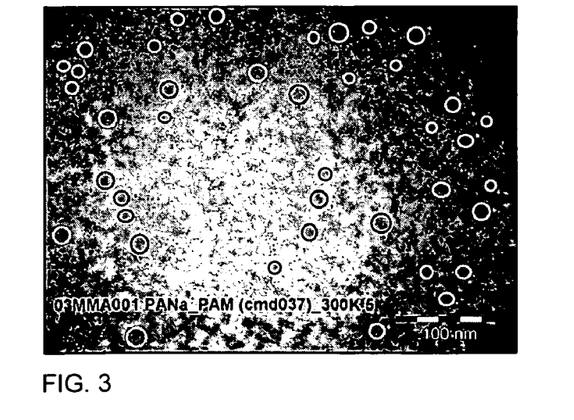
FIG. 3 is a photographic image of the patches of FIG. 2 obtained by TEM.

FIG. 3 is a photographic image obtained by TEM. The photograph shows dark and circular patches in a relatively bright background. These patches are the yttrium nanoparticle cores of the aggregates and the bright background is the polymer matrix surrounding them. It should be noted that the rare earth nanoparticles by their large electron densities absorb light more strongly than the electron beam.

Example 2

A solution of yttrium hydroxyacetate nanoparticles were prepared and in conjunction with various copolymers to demonstrate various embodiments of the invention. The yttrium hydroxyacetate nanoparticles solution will hereinafter be referred to as the yttrium base dispersion. Accordingly the yttrium base dispersion for use in this example was prepared in a reflux reactor of 1,000 ml equipped with a thermometer and a an agitating rod, by dispersing 86.5 g of yttrium oxide powder (purity of 99.99 % made by Rhodia Co., Ltd.) into 500 ml of 2N acetic acid solution (supplied by Aldrich Co., Ltd.) at an agitation rate of 300 rpm. The mixture was then heated to 100° C. in an oil bath. After reaching 100° C., the mixture was kept at 100° C. for 2 hours. The resulting solution was cooled down to the room temperature and centrifuged at 10,000 rpm to remove any non-dissolved yttrium oxide. The final solution was used as the yttrium base dispersion. The final pH of the yttrium base dispersion was 6.8.

The yttrium base dispersion was analyzed using various techniques. Using a dynamic light scattering technique, homogeneous colloidal yttrium base particles were confirmed. The hydrodynamic diameter of those particles was measured as 3.5-4.0 nm. By the quantitative analyses, the composition of the particles was expressed as Y(CH3COO) 1.3(OH)1.7 and the concentration of yttrium base particles was 25.5 wt. %. From the ignition residue, it was shown that at least 85% of the species were in a solid state. The colloidal dispersion was diluted to 1.0 and 5.0 wt. % with deionized water. The zeta potential was measured as +45 mV based on a laser-Doppler electrophoresis technique (Zetasizer 3000 made by Malvern Co., Ltd.).

Complex A

Complex A was a yttrium base dispersion with PANa-b-PAM 5 k-30 k copolymers. Complex A was formed by dissolving 1-5 g of poly(acrylic acid)-b-polyacrylamide copolymers (made by Rhodia Co., Ltd.) having an average molecular weight of 5,000 and 30,000 g/mol respectively, in deionized water such that the weight concentration became 1.0 and 5.0 wt. %. In order to dissociate a majority of carboxyl groups in the poly acrylic acid, the solution was neutralized to pH 7 with 0.25N NaOH solution (supplied by Aldrich Co., Ltd.).

The yttrium base dispersion and PANa-b-PAM solution were mixed with a vortex mixer such that the mixing ratio X=(volume of yttrium base dispersion)/(volume of PANa-b-PAM solution) were in the range of 0.01 to 100. Prior to mixing, both initial solutions were set to the same concentration. The total volume of the mixture was between 2 and 20 ml and the mixing order was both (i) from yttrium base dispersion into PANa-b-PAM solution and (ii) from PANa-b-PAM solution into yttrium base dispersion, followed immediately by a vortex mixing.

Complex B

Complex B was yttrium base dispersion with PANa-b-PAM 5 k-60 k copolymers. The complex was formed by dissolving 1-5 g of poly(acrylic acid)-b-polyacrylamide copolymers (made by Rhodia Co., Ltd.) having an average molecular weight of 5,000 and 60,000 g/mol respectively, in deionized water such that the weight concentration becomes 1.0, 5.0, and 10.0 wt. %. In order to dissociate a majority of carboxyl groups in the poly acrylic acid, the solution was neutralized to pH 7 with 0.25N NaOH solution.

The yttrium base dispersion and PANa-b-PAM solution were mixed with a vortex mixer such that the mixing ratio X=(volume of yttrium base dispersion)/(volume of PANa-b-PAM solution) was in the range of 0.01 to 100. Prior to mixing, both initial solutions were set to the same concentration. The total volume of the mixture was between 2 and 20 ml and the mixing order was both (i) from yttrium base dispersion into PANa-b-PAM solution and (ii) from PANa-b-PAM solution into yttrium base dispersion, followed immediately by a vortex mixing.

Complex C

Complex C was a yttrium base dispersion with PANa 1.2 k and 30 k homopolymers. Complex C was formed by dissolving 1-5 g of poly(acrylic acid) homopolymers (made by Aldrich Co., Ltd.) having an average molecular weight of 1,200 and 30,000 g/mol in deionized water such that the weight concentration was 1.0 wt. %. In order to dissociate a majority of the carboxyl groups in the poly acrylic acid, the solution was neutralized to pH 7 with 0.25N NaOH solution.

The yttrium base dispersion and PANa solution were mixed with a vortex mixer such that the mixing ratio X=(volume of yttrium base dispersion)/(volume of PANa solution) was in the range of 0.01 and 100. Prior to mixing, both initial solutions were set to the same concentration. The total volume of the mixture was between 2 and 20 ml and the mixing order was both (i) from yttrium base dispersion into PANa solution and (ii) from PANa solution into yttrium base dispersion, followed immediately by a vortex mixing.

Complex D

Complex D was yttrium base dispersion with PSSNa-b-PAM 7 k-30 k copolymers. Complex D was formed by dissolving 1-5 g of poly(styrene sulphonate)-b-polyacrylamide copolymers (made by Rhodia Co., Ltd.) having an average molecular weight of 7,000 and 30,000 g/mol respectively in deionized water such that the weight concentration was 1.0 and 5.0 wt. %. In order to sufficiently dissociate sulphates in the poly styrene sulphonate, the solution was neutralized to pH 7 with 0.25N NaOH solution.

The yttrium base dispersion and PSSNa-b-PAM solution was mixed with a vortex mixer such that the mixing ratio X=(volume of yttrium base dispersion)/(volume of PSSNa-b-PAM solution) was in the range of 0.01 and 100. Prior to mixing, both initial solutions were set to the same concentration. The total volume of the mixture was between 2 and 20 ml and the mixing order was both (i) from yttrium base dispersion into PSSNa-b-PAM solution and (ii) from PSSNa-b-PAM solution into yttrium base dispersion, followed immediately by a vortex mixing.

Characterization of Complexes and Initial Yttrium Base Dispersion

Using the aggregates prepared as Complexes A-D as specimens and the yttrium dispersion alone as a specimen (hereinafter Complex Z), the characterization was performed in terms of the phase stability, complex size, and the complex structure using dynamic light scattering (DLS) and small angle X-ray scattering (SAXS) techniques.

(1) Phase behavior

Each specimen was conserved at room temperature avoiding direct sunlight for more than 3 months. The aspect of the mixture showed a similar tendency for the specimens in Complex A, B, and D. There was a "reactive" mixing ratio between 0.1 and 10 where the specimen exhibited a difference in aspect, i.e., for a low concentration, bluish and slightly turbid solutions with no phase separation and for a higher concentration a phase separation with whitish sedimentation. For a lower mixing ration smaller than 1.0 and a higher mixing ratio larger than 10, the mixture was transparent with no phase separation.

More specifically, for the mixtures in Complex A and D, no phase separation was observed at the concentration C=1.0 wt. %, whereas the specimen between X=0.1 and 5.0 displayed a bluish aspect which remained unchanged over 3 months. On the other hand, when the concentration rose to 5.0 wt. %, the phase separation was immediately observed in the mixing range of 0.1 to 5.0. The specimens in Complex B exhibited no phase separation over 3 months for a concentration of at least up to about 5.0 wt. %, however, at a concentration of 10.0 wt. %, the sedimentation was observed at a mixing ratio of 0.1<X<10.0. Complex C, made from the homopolymer, showed a distinctive difference from all the others based on negatively charged block copolymers as in Complex A, B, and D. The phase separation in Complex C was instantly observed after the mixing at 1.0 wt. % in an X range of 0.1 to 10.0. This phenomenon was observed regardless of the molecular weight of PANa for 1,200 g/mol and 30,000 g/mol.

In Complex C characterization, It was observed that the reactivity of negatively charged PANa parts with yttrium base particles is strong, thus it was not possible to stabilize the resulting aggregates. However in complexes using block copolymers, i.e. Complexes A, B, and D, stabilization is possible. The well-balanced role of two copolymer blocks, i.e. the negatively charged blocks which interact with yttrium base particles and the neutral hydrophilic chains, is believed to stabilize the aggregates in an aqueous medium. The difference of stability between Complex A and B is therefore understood, and in terms of the role of the neutral PAM chains, i.e., a longer PAM chain as in Complex C, may be more favorable to stabilize the aggregates at a higher concentration.

(2) Size of the Aggregates from DLS Measurement (Hydrodynamic Radii, RH)

Figure 4A:
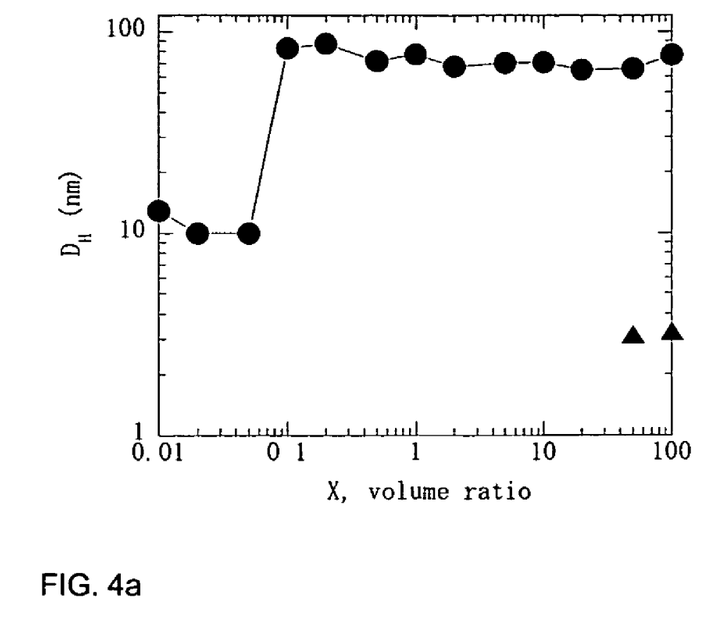
FIGS. 4a and 4b show the hydrodynamic radii of the complexes in accordance with Example 2 of the invention at a concentration of 1.0 wt. %.
Figure 4B:
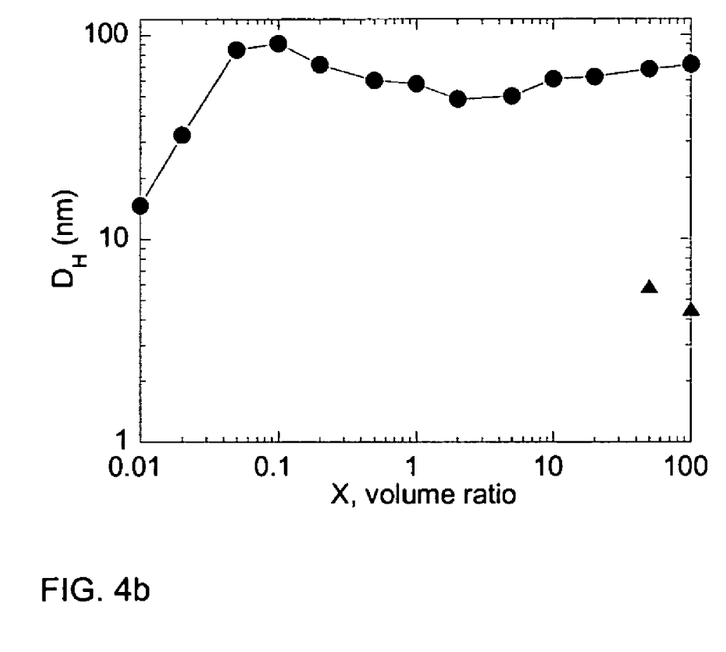

FIGS. 4a and 4b show the hydrodynamic radii of the aggregates at a concentration of 1.0 wt. % in Complex A and B as representatives. This measurement is based on DLS technique (BI-9000AT autocorrelator, made by Brookhaven Co., Ltd.). The reactive mixing ratio over 0.1 is consistent with the phase behavior as was previously described. As for a higher mixing ratio over 10.0 where a bluish aspect disappears is explained by a linear decrease of scattering intensities indicating that the number of aggregates is on the decrease at a mixing ratio around 1.0. The size of the aggregates mentioned here as a hydrodynamic diameter DH (=2 RH) is between 70 nm and 100 nm in Complex A and between 60 nm and 100 nm in Complex B. A similar tendency was also observed in the specimens of Complex D, but the size was between 100 nm and 200 nm, indicating that it is possible to control the size of the aggregates by selecting proper types of block copolymers.

(3) Structure of the Aggregates from SAXS (Radii of Gyration RG)

Figure 5:
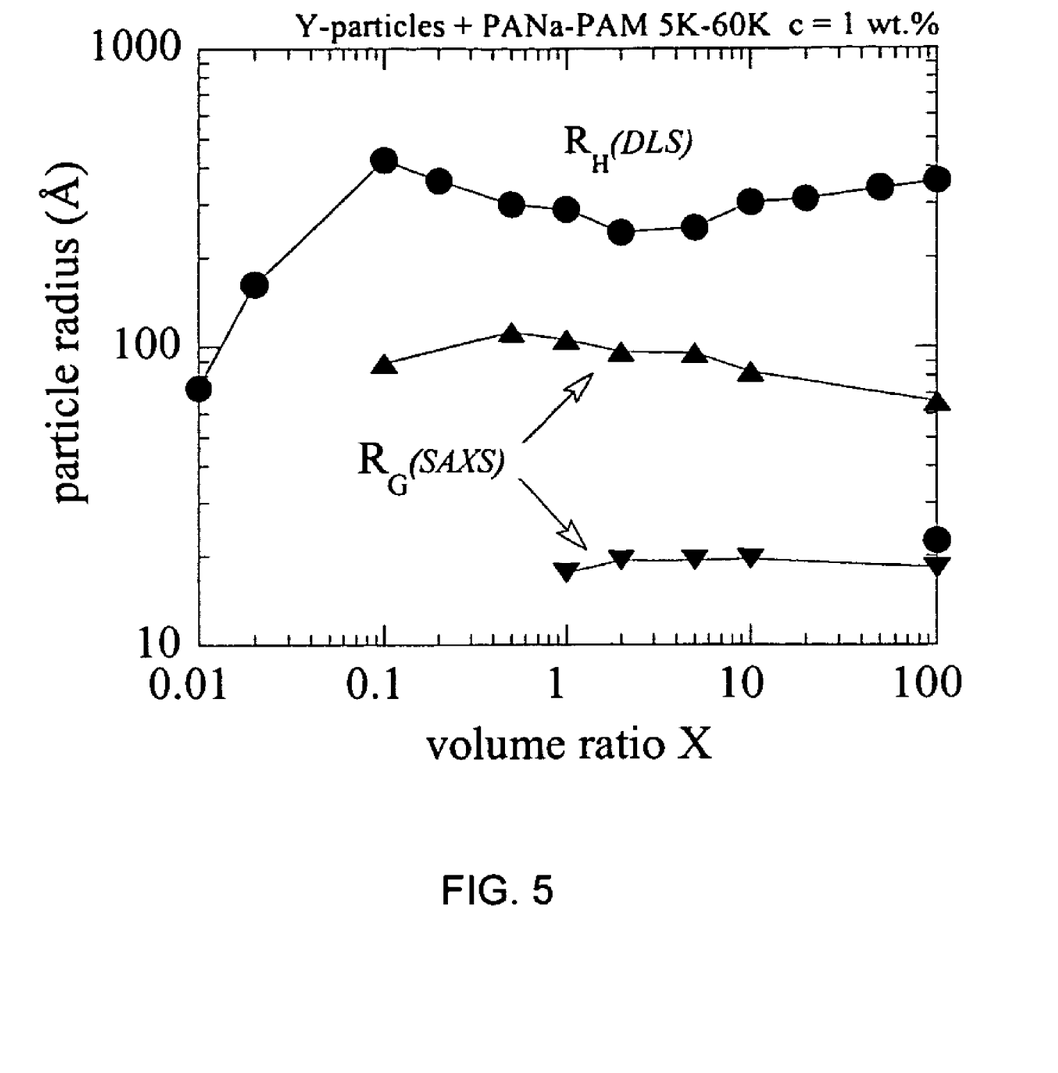
FIG. 5 shows the radii of gyration RG calculated from X-ray scattering data by the Guinier approximation and the comparison with the hydrodynamic radii RH in accordance with Example 2 of the invention.

SAXS measurement was performed (in the X21 beam line using a Brookhaven National Laboratory, N.Y., USA) for the specimens in Complexes A, B, C and D. The summary of Complex B is displayed in FIG. 5. Two different radii of gyration were obtained from the Guinier approximation on the data obtained. The smaller RG was approximately 20 Å, which is in agreement with the hydrodynamic radius obtained for yttrium base particles from DLS. The larger RG was around 100 Å, which indicate the aggregates were densely packed yttrium particles having a strong interaction with PANa chains, thus providing a picture similar to the "core-corona" structure of the complexes as schematized in FIG. 1.

(4) Stabilization Effect in Terms of pH and Ionic Strength

The stability in terms of the pH and the ionic strength was investigated for the yttrium base dispersion and the other complexes. 0.1N HNO3 and 0.1N NaOH solution (supplied by Aldrich Co., Ltd.) were used to adjust the pH. In order to see the effect of the ionic strength, KNO3 salts (supplied by Aldrich Co., Ltd.) were used as destabilizing electrolytes.

In the yttrium base dispersion alone (Complex Z) a destabilization, comprising colloidal particles, occurred by a slight shift of the pH both to the acid (dissolution) and the base (flocculation) for overall concentration up to 25.5 wt. %. On the other hand, the stabilized aggregates represented in Complex B at a 1.0 mixing ratio where most of yttrium particles participate in the aggregation, showed markedly improved stability with regard to pH changes. Complex B having an initial pH around 7 remained almost unchanged with regard to both aspect and size in a pH wide range of from 4 to 9. As for the stability in terms of the ionic strength, Complex Z flocculated once the added ionic strength reached 0.5 M for overall concentrations up to 25.5 wt. %. Thus it should be noted that by complexing those particles with copolymer as in the present invention, the yttrium particles are protected from flocculation even when a large amount of KNO3 up to 3.0 M was added. It is believed that the origin of such excellent enhancement is due to a special nature of the complex structure of the invention.

The invention claimed is:

1. A method for controlling aggregation of rare earth base particles comprising:
   complexing cationic or anionic rare earth base particles with block copolymers consisting of two blocks, A and B, wherein block A is anionic if the particles are cationic, and block A is cationic if the particles are anionic, to form a stable complex of rare earth aggregates.

2. The method of claim 1 wherein block B is neutral.

3. The method of claim 1 wherein said rare earth base particles comprise rare earth base ultrafine particles.

4. The method of claim 3 wherein forming said stable complex or rare earth aggregates comprises controlling the size of said rare earth aggregates.

5. A method for controlling aggregation of rare earth base particles comprising: complexing cationic or anionic rare earth base particles with block copolymers comprising two blocks, A and B, wherein block A is anionic if the particles are cationic, and block A is cationic if the particles are anionic, to form a stable complex of rare earth aggregates wherein said rare earth base particles comprise yttrium hydroxyacetate particles.

6. The method of claim 5 wherein said block copolymers comprise oppositely charged poly(sodium acrylate)-b-poly(acrylamide) block copolymers.

7. A method of forming yttrium hydroxyacetate aggregates, comprising complexing a yttrium hydroxyacetate particle with oppositely charged poly(sodium acrylate)-b-poly(acrylamide) block copolymers (NaPA-b-PAM).

8. A method for polishing an article comprising applying a formulation comprising
   a rare earth base particle (a), being cationic or anionic;
   a block copolymer (b), comprising two blocks A and B, wherein
      block A is cationic if particle (a) is anionic, and anionic if particle (a) is cationic, and
      block B is neutral; and
   water to an article via chemical or mechanical deposition.

9. A method of stabilizing aggregates of rare base earth particles comprising the steps of:
   i) forming a cationic or anionic rare earth base particle;
   ii) forming a block copolymer (b), consisting of two blocks A and B, wherein block A is cationic if said rare earth base particle is anionic, and anionic if said particle is cationic, and block B is neutral;
   iii) contacting said rare earth base particle with said block copolymer.

10. A method of preparing a film comprising the steps of:
    i) preparing a first solution comprising:
       a rare earth base particle (a) being cationic or anionic, and
       a liquid;
    ii) preparing a second solution comprising:
       a block copolymer (b), consisting of two blocks A and B, wherein
          block A is cationic if particle (a) is anionic, and anionic if particle (a) is cationic, and
          block B is neutral; and
       a liquid:
    iii) contacting said first solution and said second solution to obtain aggregates of rare earth base particles in solution; and
    iv) drying said aggregates of rare earth base particles in solution to form a film.

11. A composition comprising a rare earth base nanoparticle, a block copolymer, wherein said block copolymer consists of two blocks A and B, block A being cationic if particle (a) is anionic, and anionic if particle (a) is cationic, and block B being neutral, and water.

12. A formulation comprising:
    a rare earth base particle (a), being cationic or anionic;
    a block copolymer (b), consists of two blocks A and B, wherein
       block A is cationic if particle (a) is anionic, and anionic if particle (a) is cationic, and
       block B is neutral; and
    water.

13. A method of preparing the formulation of claim 12 comprising the steps of:
    i) preparing a first solution comprising:
       said rare earth base particle (a), and water ii) preparing a second solution comprising:
   said block copolymer (b), and
   water; and
iii) contacting said first solution and said second solution to obtain said formulation.

14. The method of claim 13 wherein said contacting comprises mixing.

15. The method of claim 14 wherein mixing is performed at a mixing ratio X, wherein $$X = \frac{\text{Volume of said first solution at } C_0}{\text{Volume of said second solution at } C_0}$$

and $C_0$ is an initial concentration, and X is from about 0.01 to about 100.

* * * * *